United States Patent

[11] 3,603,166

| | | | |
|---|---|---|---|
| [72] | Inventor | Maurice O. Holtan | |
| | | 2012 Menomonee Pkwy, Wauwatosa, Wis. 53226 | |
| [21] | Appl. No. | 825,009 | |
| [22] | Filed | May 15, 1969 | |
| [45] | Patented | Sept. 7, 1971 | |

[54] SEMIAUTOMATIC TRANSMISSION
8 Claims, 8 Drawing Figs.

[52] U.S. Cl. ............................................... 74/331, 74/368
[51] Int. Cl. ............................................... F16h 3/08
[50] Field of Search ............................................... 74/331, 342, 359–361, 343, 345, 745, 368

[56] References Cited
UNITED STATES PATENTS

| 3,146,633 | 9/1964 | Schmitter et al. | 74/745 X |
| 3,175,425 | 3/1965 | Horne et al. | 74/745 |
| 1,663,026 | 3/1928 | Schultze | 74/343 X |
| 2,072,057 | 2/1937 | Rauen | 74/329 X |
| 2,791,912 | 5/1967 | Bixby | 74/344 |
| 3,026,980 | 3/1962 | Hoff | 192/105 |
| 3,173,302 | 3/1965 | Robinson | 74/342 |
| 1,727,577 | 9/1929 | Wemp | 74/343 |

*Primary Examiner*—Arthur T. McKeon
*Attorney*—Wheeler, House and Wheeler

ABSTRACT: A compact spur gear rate changer having some gears shiftable manually and having a centrifugal clutch for effecting rate changes otherwise, is preferably used to supplement rate changes effected by torque and speed changes to which a belt drive rate changer of the split pulley type is subject. Particularly when the power source is a two cycle engine, a relatively high-speed engine operation is required to develop maximum power. By using the semiautomatic gear transmission to supplement rate changes developed by the split pulley and belt, the engine is enabled to develop full power almost immediately and greatly improved acceleration is noted.

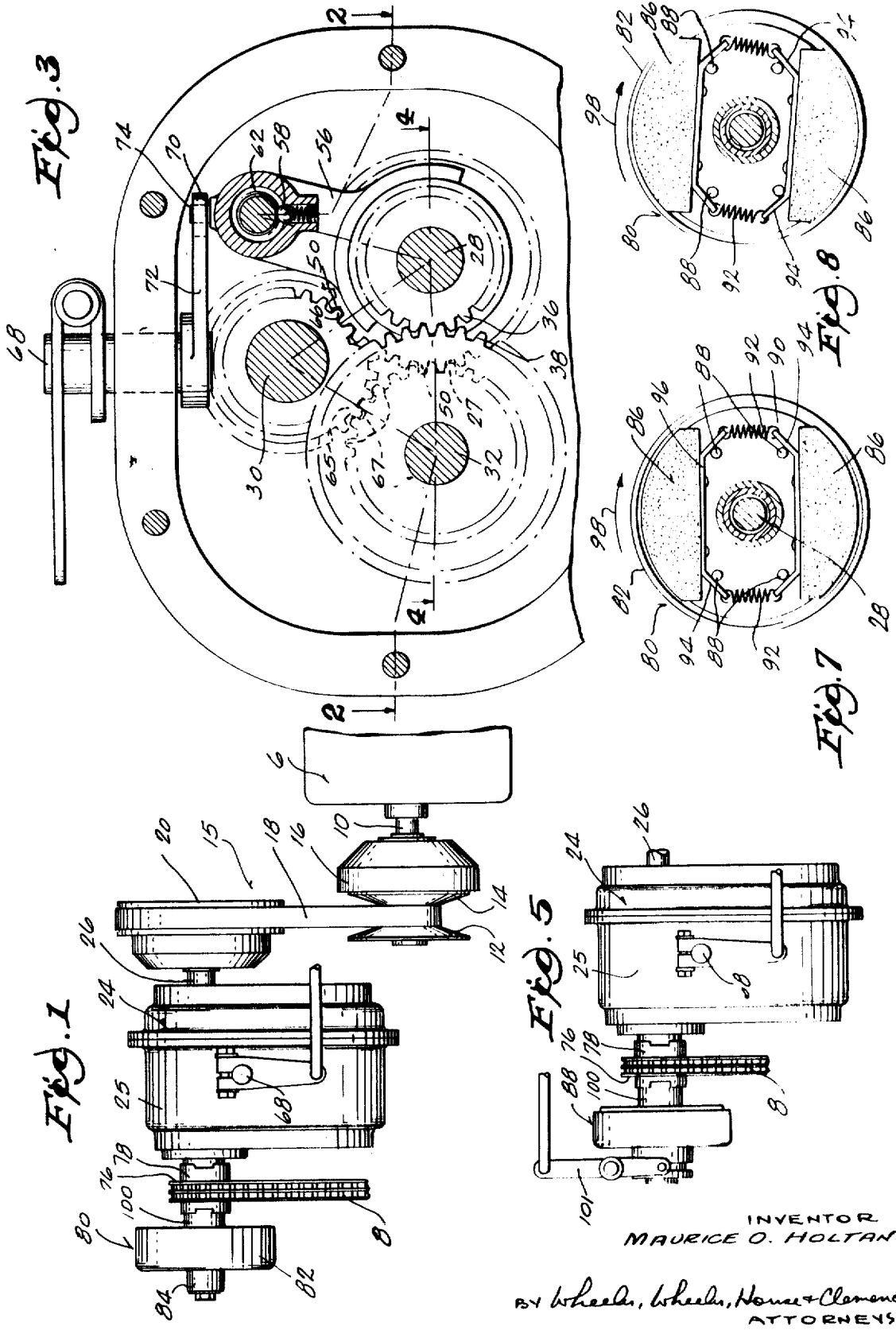

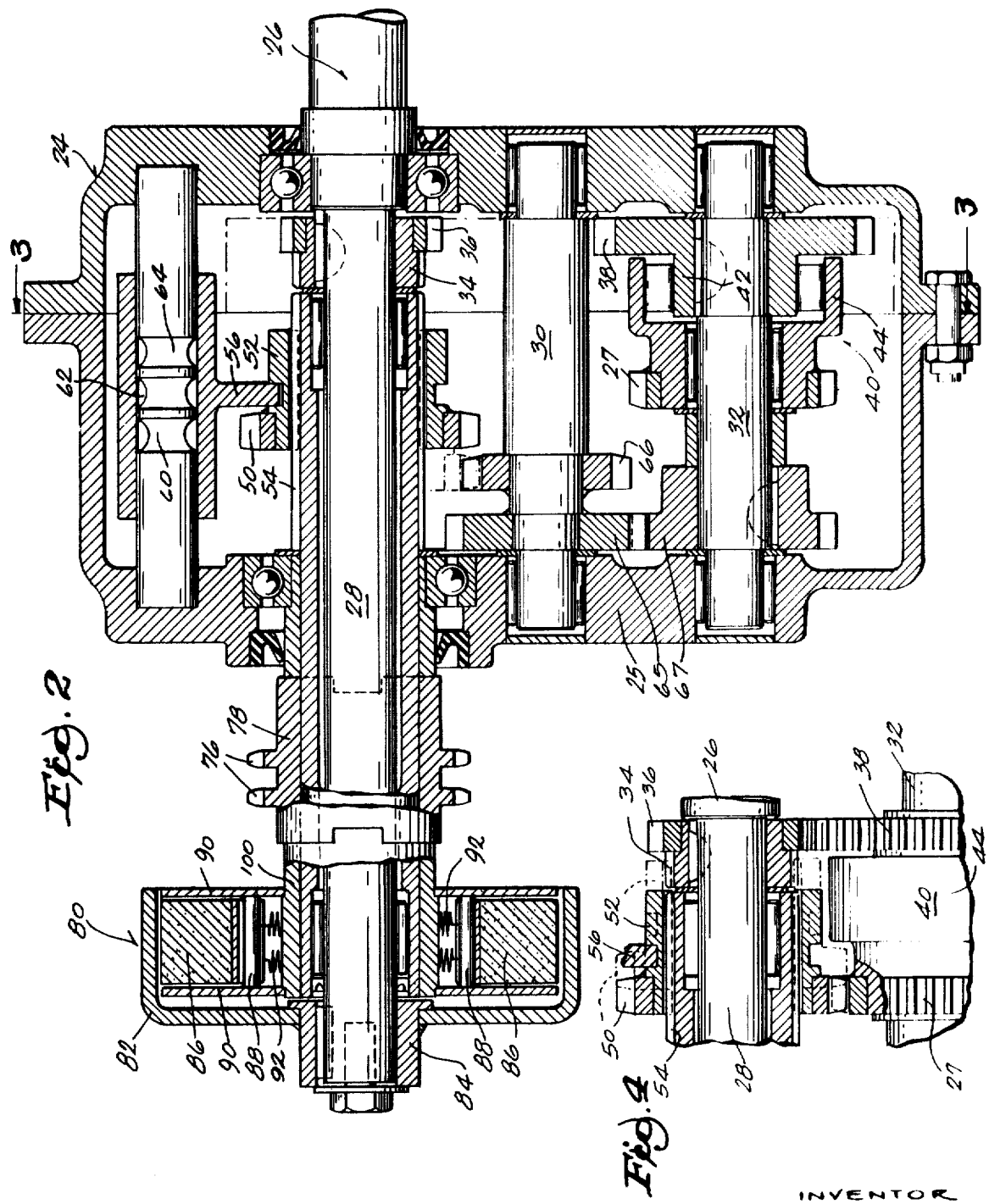

SEMIAUTOMATIC TRANSMISSION

SUMMARY OF THE INVENTION

The invention resides in the particular arrangement of parts to provide a compact rate changer of the spur gear type, subject in part to the functioning of a centrifugal clutch. More specifically, the invention resides in the combination of the spur gear rate changer in sequence with the split pulley belt-type rate changer to maintain a prime mover at high power throughout a wider range of loads than has heretofore been available.

BRIEF DESCRIPTION OF DRAWINGS

FIG. 1 is a fragmentary plan view of a portion of a vehicle drive.

FIG. 2 is an enlarged view taken in section on the line 2—2 of FIG. 3.

FIG. 3 is a view taken in section on the line 3—3 of FIG. 2.

FIG. 4 is a fragmentary detailed view taken in section on the line 4—4 of FIG. 3.

FIG. 5 is a fragmentary detailed view showing a modification of the structure illustrated in FIG. 1.

FIG. 7 is a diagrammatic cross-sectional view of a special form of centrifugal clutch preferably used in the device, the shoes being illustrated in disengaged position.

FIG. 8 is a view similar to FIG. 7 showing the shoes engaged with the drum.

DETAILED DESCRIPTION

Figure 6:
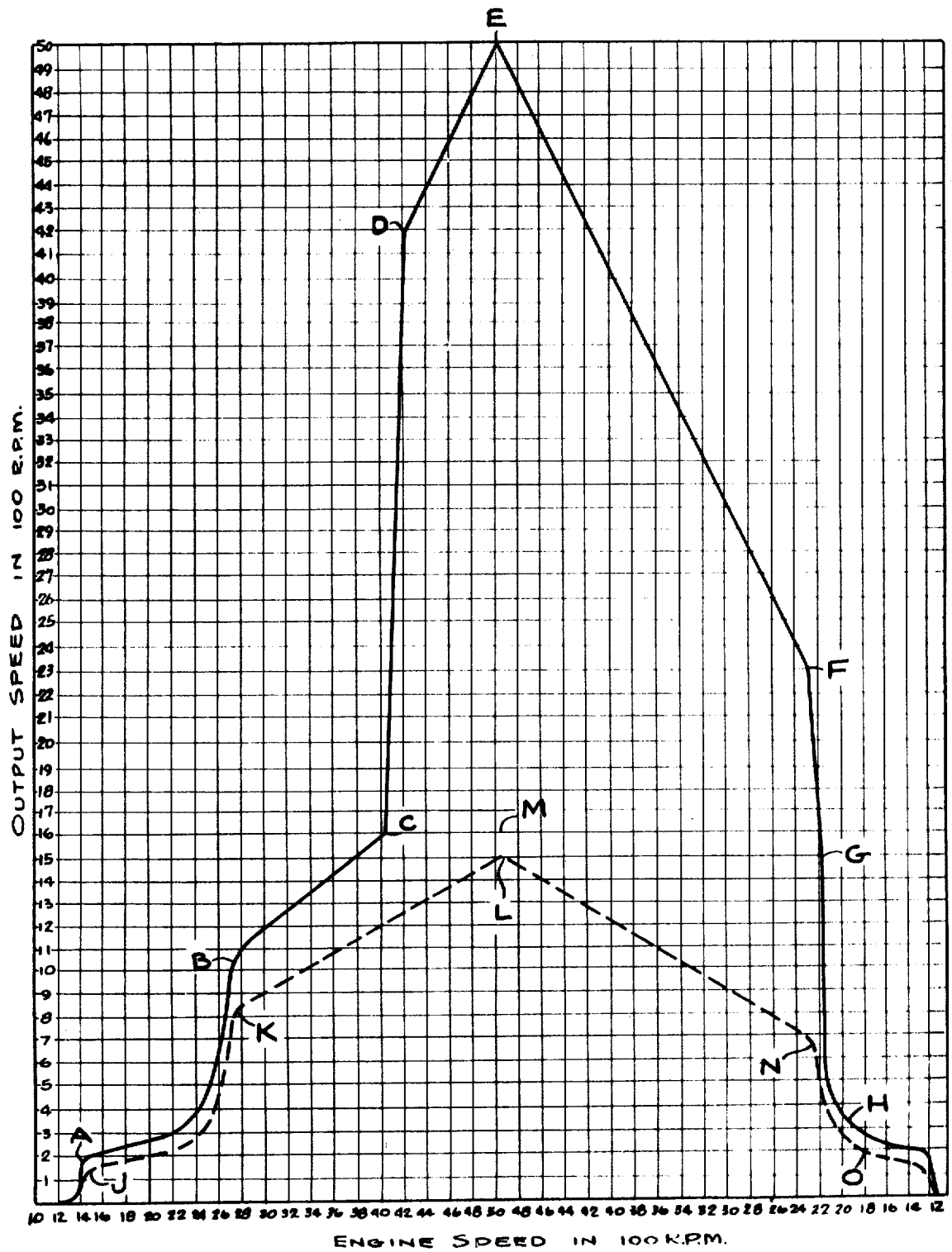
FIG. 6 is a diagram showing the operation of the assembly.

By way of illustration and not by way of limitation, the drive illustrated is one which is used on a snowmobile between the prime mover 6 the chains thechains 8 which drive the ground engaging track (not shown). The power shaft 10 of the engine 6 actuates a conventional split pulley rate changer 15. The component parts 12 and 14 of the drive pulley 16 are biased toward each other but separate under load and/or speed to reduce the effective radius of the pulley as it drives the belt 18 for the operation of the driven pulley 20. In the exemplification there is a 3–1 reduction. This decreases to 1–1 as the load diminishes and the speed increases. Instead of driving the chains 8 directly from pulley 20, the present invention contemplates that the mechanical rate changer 24 intervene. This device is a novel and compact organization best shown in FIGS. 2 and 3.

I shall first describe the mechanical elements and later describe the operation.

THe mechanical rate changer housing 25 is spanned by shafts on three axes. The relationship of these axes is shown in FIG. 3. FIG. 2 is a developed view.

The first axis is that of extension 28 of input shaft 26. The second axis is that of jack shaft 30. The third axis is that of shaft 32.

Keyed to shaft 28 is a toothed hub 34 which carries gear 36. This gear meshes with the gear 38 of which the hub is part of a conventional overrunning sprag clutch 40. Gear 38 always drives shaft 32, to which it is keyed. Its hub 42 will drive the output element 44 of sprag clutch 40 unless element 44 overruns.

A gear 50 has its hub 52 splined to a toothed sleeve shaft 54 which is concentric with shaft 28. The gear 50 can be shifted axially by means of shifting fork 56 which has three positions impositively defined by engagement of ball detent 58 in one of the grooves 60, 62 or 64. The parts are shown in FIG. 2 in a neutral position. The gear 50 is not in engagement with gear 27 of the sprag clutch 40 nor with reversing gear 66 on jack shaft 30. Shifting of gear 50 is effected by oscillation of rock shaft 68 to move the slotted end 70 of rocker arm 72. This arm engages pin 74 to move fork 56 (FIG. 3). If the fork is moved far enough to the right (as viewed in FIG. 2 and FIG. 4) the toothed hub 52 of gear 50 will span the gap between the splined hub 34 and the splined sleeve shaft 54 for direct drive from input shaft 26 to the sprockets 76 for drive chains 8. This is shown in FIG. 4 in dotted lines. This is direct drive or high speed forward.

To obtain an automatic shifting position forhigh and low speeds, gear 50 is shifted to a position in line with and to mesh with gear 27 of the sprag clutch 40 which would either have the power flow through the sprag clutch in low gear or allow the sprag clutch to override when the centrifugal clutch 80 is engaged in high gear.

A conventional centrifugal clutch does not give as good results in this device as a special form of centrifugal clutch which is called a pin cage clutch. In addition to an axial section of the preferred construction as shown in FIG. 2, I have illustrated a transverse cross section in FIG. 7 which shows the clutch disengaged and another transverse section in FIG. 8 which shows it engaged.

The clutch 80 comprises a drum 82 mounted on a hub 84 which is fixed to the drive shaft 28 to rotate at all times at he speed of the input shaft 26. The centrifugally actuated shoes 86 rest on pins 88 which are carried by a cage or disk 90. Loaded tension springs 92 hold the shoes 86 against the pins. The springs are connected with the camming ends 94 of straps 96 attached to the respective shoes. In FIG. 7 the shoes are shown disengaged from 82. The straps 96 are connected with respect to the pins 88. The direction of drum rotation is indicated by the arrow 98 in FIG. 7.

The cage 90 is mounted on an inner hub 100 which is coupled with the sleeve 78 on which the sprockets 76 are mounted.

At speeds below a predetermined value, the shoes 86 can rotate without contacting the drum 82. At speeds above the predetermined value, the shoes are centrifugally urged outwardly into contact with the drum. That contact causes each shoe to shift slightly in the direction of drum rotation as shown in FIG. 8. This creates a wedging action by driving the respective cam terminals 94 of the straps 96 onto the supporting pins 88 of the cage 90. The resulting wedging action maintains the respective shoes tightly in engagement with the drum 82 as long as the parts remain subject to substantial driving torque. In other words, the clutch will remain engaged down to a speed level below the point of engagement.

There are many advantages in this arrangement. In a vehicle, for example, the driving connection between the engine and the propelling tracks or wheels will continue effective downhill as well as up. The operator may terminate this connection by abrupt acceleration and deceleration when the vehicle is below the speed at which the clutch is designed to engage.

Instead of a centrifugal clutch, I may, in some embodiments, use a clutch 88 manually operated by lever 101 as shown in FIG. 5.

THE OPERATION

The power derived from engine 6 through the split pulley rate changer and belt 18 is received in shaft 26. Initially there is a 3–1 reduction in rate changer 15 when the speed of the engine increases to the r.p.m. of the engagement of the pulley. When the engine is idling, this pulley is completely disengaged and in neutral.

Motion is constantly transmitted from gear 36 to gear 38 and when shifted into automatic operation motion will pass through the sprag clutch 40 to gear 27 which will engage gear 50 and motion will be communicated through to chains 8 to do the work in low gear.

As the speed of the engine increases, the component parts 12 and 14 of the drive pulley 16 come together, increasing the diameter of this pulley until the ratio is 1–1 with the diameter of the driven pulley 20. This increase of speed is communicated through the power train described above (low gear) to a point where the shoes 86 of the centrifugal clutch engage with the drum 82 so that the power train is now changed from the gear train before described (low gear) to shaft 26 and its extension 28, hub 84, drum 82, shoes 86, cage disk 90, hub 100 to sprocket 76 and chains 8 and is now driven at a 1-1 drive ratio, or commonly termed as high gear. This automatic shifting of speeds from low to high gear will also function automatically from high to low gear. When the speed of the wheels, track or chains 8 is reduced sufficiently to disengage the centrifugal clutch 80, then the low gear train will take over through the sprag clutch 40. It will again engage in high gear when the speed of the chains 8 is increased to the speed of engagement of the centrifugal clutch 80.

It is necessary to assign values for illustrative purposes to the gear ratios in the device. Without limitation, it may be noted that in practice the gear 36 has 18 teeth and the gear 38 has 36 teeth so that the ratio is 1-2. The gear 27 has 24 teeth and the gear 50 has 30, , resulting in further speed reduction and mechanical advantage. The primr mover is therefore adapted to develop very substantial power while the work is being driven at a relatively low speed.

As soon as the speed of the sprockets 76 becomes adequate, the centrifugal clutch is engaged, the shoes 86 being centrifugally engaged with drum 82 against the bias of the retracting springs 92. Inasmuch as the drum 82 is in direct mechanical driven connection with shaft 26 and its extension 28, the sprockets 76 are now driven at a 1-1 drive ratio between the input shaft and the sprocket 76.

In order to obtain high gear manually or a "locked high," the operator can do so by shifting the shifting fork 56 in the position shown in broken lines in FIG. 4 so that motion will be communicated across the gap between hub 34 and sleeve 54. In any 1-1 drive ratio, however achieved, the gear 50 will be rotating the driven member 44 of the sprag clutch 40 at a rate faster than the driving member 42 of such clutch, thus causing the clutch to overrun.

In the third position of gear 50, in which it meshes with reverse gear 66, motion will be transmitted in a reverse direction to the sleeve 54 and sprockets 76. The reverse gear 66 is positively driven at all times because gear 65 on shaft 30 meshes with gear 67 on shaft 32. In this reverse direction, the sprag clutch will ran freely as gears 27 and 50 are not then engaged. If the centrifugal clutch 80 were to become engaged when in reverse gear, there would be breakage because the gear train would tend to turn the sprockets in a direction opposite to which the gear 50 is being rotated by reverse gear 66. Accordingly, the values of the gear ratios are so chosen that at the speed at which the reverse gears can operate, the centrifugal clutch 80 will never become engaged.

In FIG. 6, the engine is assumed to be capable of 5,000 r.p.m. and the centrifugal clutch assuming to have an engagement speed of 1,600 r.p.m. and a disengagement speed of 1,500 r.p.m. The rate of change achieved in the split pulley belt drive will, as the engine increases speed, result in changes in ratio from 3-1 1-1 as shown on the chart between the points A and B. The engine is still turning at only about half speed. After the belt rate reaches 1-1 ratio, the changes in output will be as illustrated between B and C.

Increases in engine speed would be very slow but for the fact that a very considerable reduction is still being provided in the mechanical change speed transmission. By virtue of this reduction, the engine gains speed and power much more rapidly than would otherwise be possible. By the time the output speed reaches 1,600, the centrifugal clutch 80 begins to engage. At a 1-1 ratio between the input and output shafts, and with full engine power available, pickup in output speed becomes so rapid as to increase from C to D while the clutch is engaging. Beyond point D they only increase between D and E is the result of increases in engine speed to the assumed maximum of 5,000 r.p.m.

When the engine is decelerated to cause reduction of output speed from E to F, neither of the automatic rate changers becomes immediately effective. At point F, the ratio of motion transmission in the split pulley and belt device commences to increase from 1-1 until, at point H, it is restored to a 3-1 ratio. At the point G the centrifugal clutch commences to disengage. Due to slippage, the disengagement is not complete until point H is reached.

The broken line shows how the device functions in reverse, The split pulley and belt device 15 starts with a 3-1 ratio at point J and reaches a 1-1 ratio at point K. Acceleration between points K and L (where the engine achieves maximum speed) occurs with the mechanical rate changer 24 at its lowest ratio. It will be noted that the centrifugal clutch never engages in reverse because the speed never reaches 1600 r.p.m. at the level indicated by the line M. Consequently, the mechanical device never goes to a 1-1 ratio. This is important because the two parts of the centrifugal clutch are rotating in opposite directions and breakage would result if the shoes were to engage in reverse.

The only clutch ratio change that occurs in the retardation of engine speed is brought about in the belt and split pulley between the points N and 0.

Rapid acceleration of a vehicle such as a snowmobile is an objective long sought and not previously achieved. With the two transmissions in series as herein disclosed, the acceleration of the load (a snowmobile in this instance), is very much more rapid than has heretofore been possible because the engine is permitted to achieve rapidly an r.p.m. in which substantially full power is developed before it is necessary to move the load at top speed.

I claim:

1. A transmission for communicating motion from a prime mover to a vehicle, said transmission comprising the combination with a split pulley and belt variable speed reduction mechanism having a prime mover input shaft and a gear-type rate changer having an input shaft operatively connected with the split pulley and belt mechanism to receive motion therefrom and having an output driving connection to the vehicle for the actuation thereof, said rate changer including high and low reduction drives, one of said drives having an overrunning clutch, and a centrifugal clutch for effecting transfer from a high reduction drive to a low reduction drive and automatically effective at a predetermined speed of the output driving connection to the vehicle.

2. A transmission according to claim 1 in which said rate changer includes reversing gearing having a ratio sufficiently low so that said output driving connection will never function through said reversing gearing at a speed at which said clutch will automatically engage.

3. A transmission according to claim 1 in which said clutch is a pin cage clutch having a drum connected with said input shaft to be constantly actuated therefrom, and a hub having centrifugally operable shoes yieldably mounted thereon for movement to engagement with said drum at a predetermined rate of operation of said hub, said hub being connected with said output driving connection.

4. A transmission according to claim 3 in which said hub has a supporting cage for said shoes and said shoes and cage have complementary wedging surfaces operable to develop radial thrust of said shoes toward said drum when said shoes are displaced circumferentially consequent upon engagement with the drum.

5. A transmission according to claim 1 in which the gear-type rate changer comprises a second shaft, a first gear on the input shaft, a second gear meshing with the first gear and disposed on the second shaft, a sprang clutch including a driving rotor connected with the second gear and having a driving rotor mounted for rotation relative to the second shaft, means for transmitting motion between the driving and driven rotors in one direction of relative rotation and including a sprag for transmitting motion from the second shaft to the said output driving connection, and a second means for transmitting motion to said output driving connection and including a clutch having a driving element connected with said input shaft and a driven element in driving relation to said output connection.

6. A transmission according to claim 5 in which said clutch is a centrifugal clutch, the driving element including a drum in permanent connection with the input shaft, and the driven element comprising a hub in operative motion transmitting connection with the output connection, and shoes yieldably mounted on the hub and centrifugally movable to and from engagement with said drum for effecting direct drive from the input shaft to the output driving connection, said sprag clutch overrunning to accommodate such direct drive.

7. A transmission according to claim 6 in which said second shaft and said output driving connection have a selectively operable reverse gear drive alternatively available for actuating the output driving connection in lieu of the sprag clutch, the reverse drive including speed reduction gearing adapted to maintain reverse operation of the output driving connection at a speed below that at which said centrifugal clutch shoes engage said drum.

8. A transmission according to claim 6 in which said centrifugal clutch is a pin cage clutch, said hub having a disk from which pins project and on which pins said shoes are supported, shoes at opposite sides of said hub being resiliently yieldably connected with each other and held thereby on said pins to yield from said pins in the direction of said drum, the respective shoes having freedom of movement circumferentially of said hub and the shoes an pins having camming surfaces adapted in the course of relative circumferential movement to wedge the respective shoes against the hub.

UNITED STATES PATENT OFFICE
CERTIFICATE OF CORRECTION

Patent No. 3,603,166          Dated September 7, 1971

Inventor(s) Maurice O. Holtan

It is certified that error appears in the above-identified patent and that said Letters Patent are hereby corrected as shown below:

Column 1, Line 33, change "the chains thechains" to and the chains

Column 2, Line 3, change "forhigh" to for high

Column 2, Line 17, change "he" to the

Column 2, Line 23, change "connected" to center

Column 3, Line 15, change "primr" to prime

Column 3, Line 38, change "ran" to run

Column 3, Line 51, insert to between "3-1" and "1-1"

Column 4, Line 59, change "sprang" to sprag

Column 6, Line 8, change "an" to and

Signed and sealed this 14th day of March 1972.

(SEAL)
Attest:

EDWARD M. FLETCHER, JR.
Attesting Officer

ROBERT GOTTSCHALK
Commissioner of Patents